(12) United States Patent
Venkatesan et al.

(10) Patent No.: US 10,613,628 B2
(45) Date of Patent: Apr. 7, 2020

(54) MEDIA DRIVEN HAPTICS

(71) Applicant: Immersion Corporation, San Jose, CA (US)

(72) Inventors: Srivatsav Venkatesan, Sunnyvale, CA (US); Kaniyalal Shah, Fremont, CA (US); Stephen Rank, San Jose, CA (US); William S. Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/979,309

(22) Filed: Dec. 22, 2015

(65) Prior Publication Data

US 2016/0175704 A1    Jun. 23, 2016

Related U.S. Application Data

(60) Provisional application No. 62/096,251, filed on Dec. 23, 2014.

(51) Int. Cl.

| A63F 13/00 | (2014.01) |
| G06F 3/01 | (2006.01) |
| A63F 13/285 | (2014.01) |
| A63F 13/23 | (2014.01) |
| A63F 13/42 | (2014.01) |
| A63F 13/218 | (2014.01) |

(52) U.S. Cl.
CPC ............ *G06F 3/016* (2013.01); *A63F 13/218* (2014.09); *A63F 13/23* (2014.09); *A63F 13/285* (2014.09); *A63F 13/42* (2014.09)

(58) Field of Classification Search
None
See application file for complete search history.

(56) References Cited

U.S. PATENT DOCUMENTS

| 6,020,876 A | * | 2/2000 | Rosenberg | G06F 3/011 |
| | | | | 345/157 |
| 6,184,868 B1 | * | 2/2001 | Shahoian | A63F 13/06 |
| | | | | 345/156 |
| 8,767,996 B1 | | 7/2014 | Lin et al. | |

(Continued)

FOREIGN PATENT DOCUMENTS

| JP | 2004033371 | 2/2004 |
| JP | 2014194768 | 10/2014 |

(Continued)

OTHER PUBLICATIONS

JP2017-522604 , "Office Action", dated Jan. 28, 2020, 2 pages.

*Primary Examiner* — Paul A D'Agostino
(74) *Attorney, Agent, or Firm* — Kilpatrick Townsend & Stockton LLP (57) ABSTRACT

The embodiments are directed toward techniques for modifying a haptic effect that is rendered based on a media stream. Upon receiving the media stream, a haptic drive signal is generated based on the media stream. The haptic drive signal is then applied to render the haptic effect at a haptic output device. Within a media editing application, the media stream may be modified. In response to the modification, a modified haptic drive signal may be generated based on the modification to the media stream. As a result, a modified haptic effect is rendered at the haptic output device.

25 Claims, 10 Drawing Sheets

(56) References Cited

U.S. PATENT DOCUMENTS

| | | |
|---|---|---|
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,576,445 B2 | 2/2017 | Cruz-Hernandez et al. |
| 9,619,980 B2 | 4/2017 | Cruz-Hernandez et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,652,945 B2 | 5/2017 | Levesque et al. |
| 9,711,014 B2 | 7/2017 | Cruz-Hernandez et al. |
| 9,760,166 B2 | 9/2017 | Ammi et al. |
| 9,778,743 B2 | 10/2017 | Grant et al. |
| 9,811,854 B2 | 11/2017 | Lucido |
| 9,851,799 B2 | 12/2017 | Keller et al. |
| 9,866,924 B2 | 1/2018 | Grant et al. |
| 9,933,851 B2 | 4/2018 | Goslin et al. |
| 9,948,885 B2 | 4/2018 | Kurzweil |
| 2006/0142657 A1* | 6/2006 | Quaid ............ A61B 17/1764 600/424 |
| 2006/0290662 A1* | 12/2006 | Houston ............ A63F 13/06 345/156 |
| 2008/0132313 A1* | 6/2008 | Rasmussen ........... G07F 17/32 463/16 |
| 2009/0096632 A1 | 4/2009 | Ullrich et al. |
| 2011/0111862 A1* | 5/2011 | Allen ................. G07F 17/32 463/42 |
| 2011/0260990 A1* | 10/2011 | Ali .................... G06F 3/016 345/173 |
| 2013/0227410 A1 | 8/2013 | Sridhara et al. |
| 2014/0079251 A1 | 3/2014 | O'Grady et al. |
| 2014/0300454 A1 | 10/2014 | Lacroix et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

FOREIGN PATENT DOCUMENTS

| | | |
|---|---|---|
| JP | 2014204445 | 10/2014 |
| JP | 2014216017 | 11/2014 |

\* cited by examiner

MEDIA DRIVEN HAPTICS

PRIORITY APPLICATION

This application claims the benefits of U.S. Provisional Patent Application No. 62/096,251, filed on Dec. 23, 2014, which is incorporated herein by reference in its entirety.

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example embodiment, functionality for providing a haptic effect that is rendered based on a media stream is provided. Upon receiving the media stream, a haptic drive signal is generated based on the media stream. The haptic drive signal is then applied to render the haptic effect at a haptic output device. Within a media editing application, the media stream may be modified. In response to the modification, a modified haptic drive signal may be generated based on the modification to the media stream. As a result, a modified haptic effect is rendered at the haptic output device.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Example embodiments are directed toward functionality for providing a haptic effect that is rendered based on a media data stream. The media stream may originate from a variety of applications, thus extending use of haptic effects to such applications. Upon receiving the media stream, a haptic drive signal is generated based on the media stream. The haptic drive signal is then applied to render the haptic effect at a haptic output device. In some configurations, the media stream may be modified. For example, the media steam may be modified by a media editing application. In response to the modification, a modified haptic drive signal may be generated based on the modification to the media stream such that a modified haptic effect is rendered at the haptic output device.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
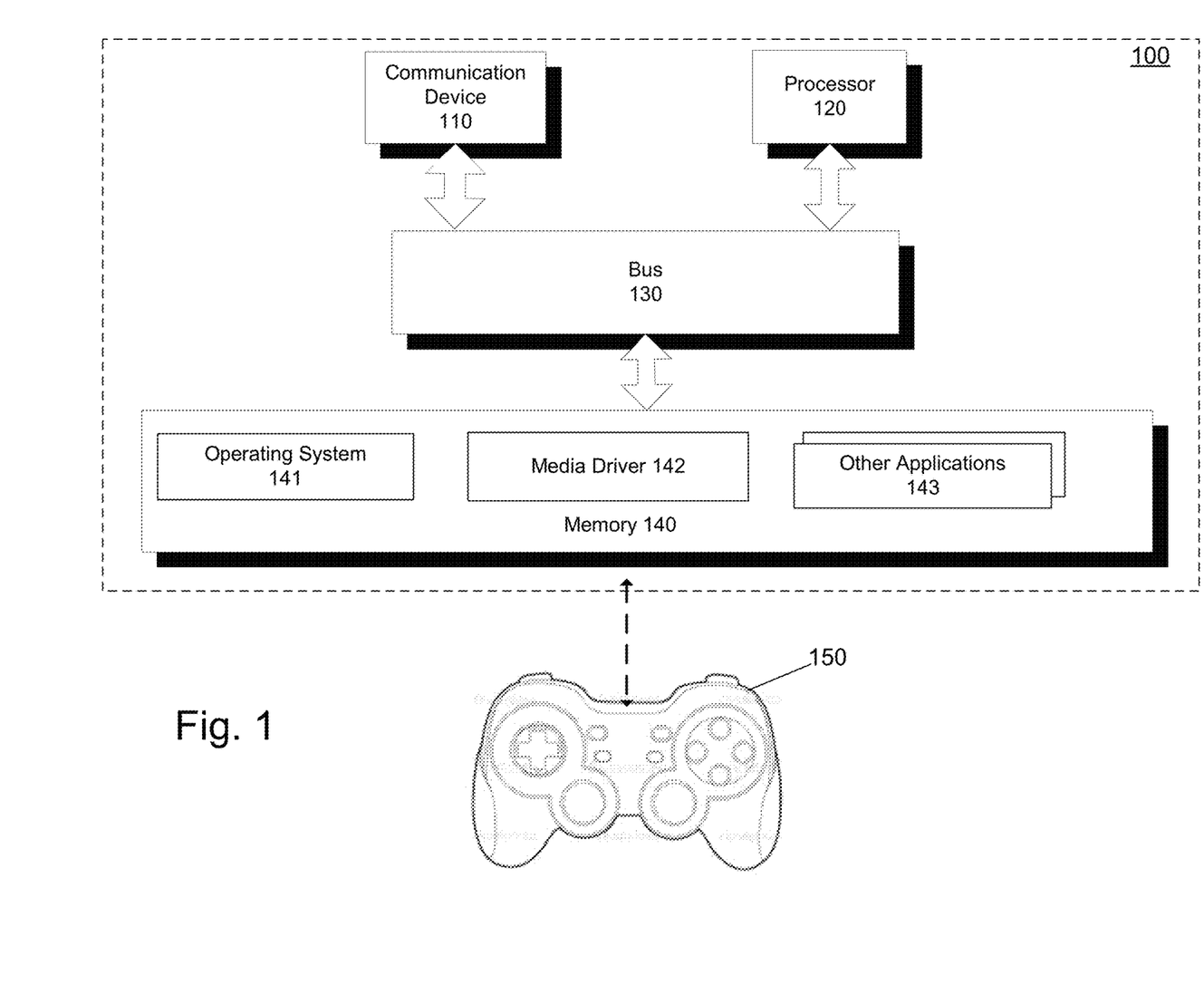
FIG. 1 illustrates a block diagram of a system according to an example embodiment of the present invention.

FIG. 1 illustrates a block diagram of a system 100 according to an example embodiment of the present invention.

System 100 may include a communication device 110 configured to transmit and/or receive data from remote sources. Communication device 110 may enable connectivity between a processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a micro-processing device, or may include multiple integrated circuit devices and/or circuit boards working in cooperation to accomplish the functions of processor 120. In addition, processor 120 may execute computer programs, such as an operating system 141, a media driver module 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include operating system 141 that provides operating system functionality for system 100. The modules may further include media driver module 142 that is configured to provide a haptic effect that is rendered based on a media stream. The media stream may originate from a variety of other applications 143. Accordingly, haptic effects may be extended to other applications 143. In some configurations, the media data stream may be modified such that additional haptic effects may be rendered based on the media stream. Other applications 143 in system 100 may include additional functionality, such as peripheral firmware configured to provide control functionality for a peripheral device, such as controller 150 (e.g., a gamepad, wearable device, etc.).

Non-transitory memory 140 may include a variety of computer-readable media that may be accessed by processor 120. In the various embodiments, memory 140 may include volatile and nonvolatile media, removable and non-removable media. For example, memory 140 may include any combination of random access memory ("RAM"), dynamic RAM ("DRAM"), static RAM ("SRAM"), read only memory ("ROM"), flash memory, cache memory, and/or any other type of non-transitory computer-readable media. Alternatively, or additionally, memory 140 may include one or more network or cloud accessible storage media.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100. In embodiments in which controller 150 has a local processor, additional functionality, such as media driver modules and peripheral firmware configured to provide control functionality may reside within controller 150.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 150. Alternatively, the haptic effects can be experienced at an outer surface of controller 150.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. The haptic output device may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
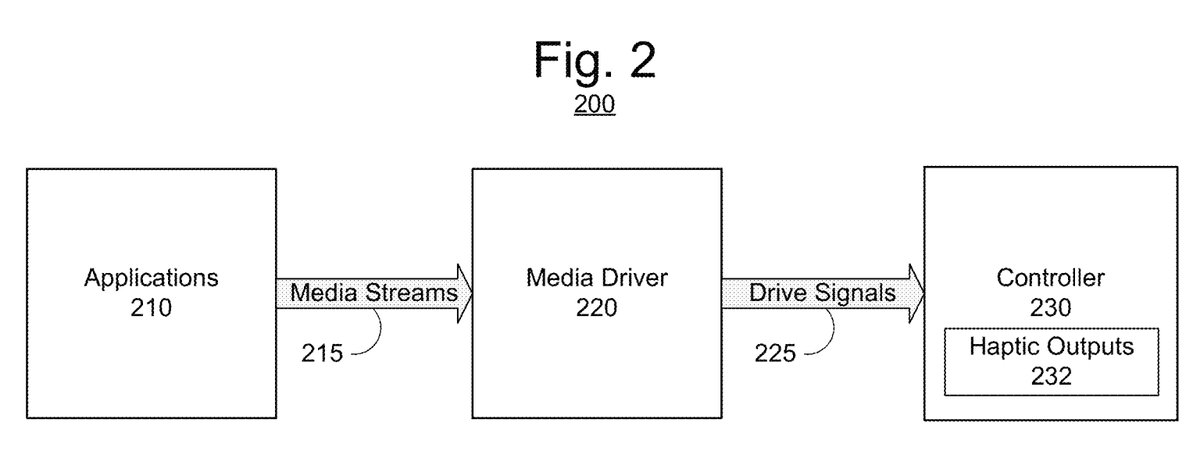
FIG. 2 is a simplified block diagram illustrating a system for providing a haptic effect that is rendered based on a media stream according to an example embodiment of the present invention.

FIG. 2 is a simplified block diagram illustrating a system 200 for providing a haptic effect that is rendered based on a media stream according to an example embodiment of the present invention.

As shown in FIG. 2, system 200 includes one or more applications 210. Each of applications 210 may generate a variety of media streams 215, such as standard or proprietary audio and/or video streams.

Media streams 215 are supplied to a media driver 220. Upon receiving media stream 215, media driver 220 may generate haptic drive signals 225 based on media streams 215. In some configurations, haptic drive signals 225 may be embedded within media streams 215. In other configurations, haptic drive signals 225 may be generated by media driver 220 based media streams 215 in real-time, or substantially real-time. Haptic drive signals 225 are then transmitted to a controller 230.

At controller 230, haptic drive signals 225 may be executed by one or more haptic output devices 232. By executing haptic drive signals 225, haptic output devices 232 render the haptic effect to an end user.

In some embodiments, media streams 220 may be modified. For example, media steams 215 may be modified by a media editing application. In response to the modification, a modified haptic drive signal (not shown) may be generated based on the modification to media streams 215 such that a modified haptic effect is rendered at haptic output devices 232 within controller 230.

Figure 3:
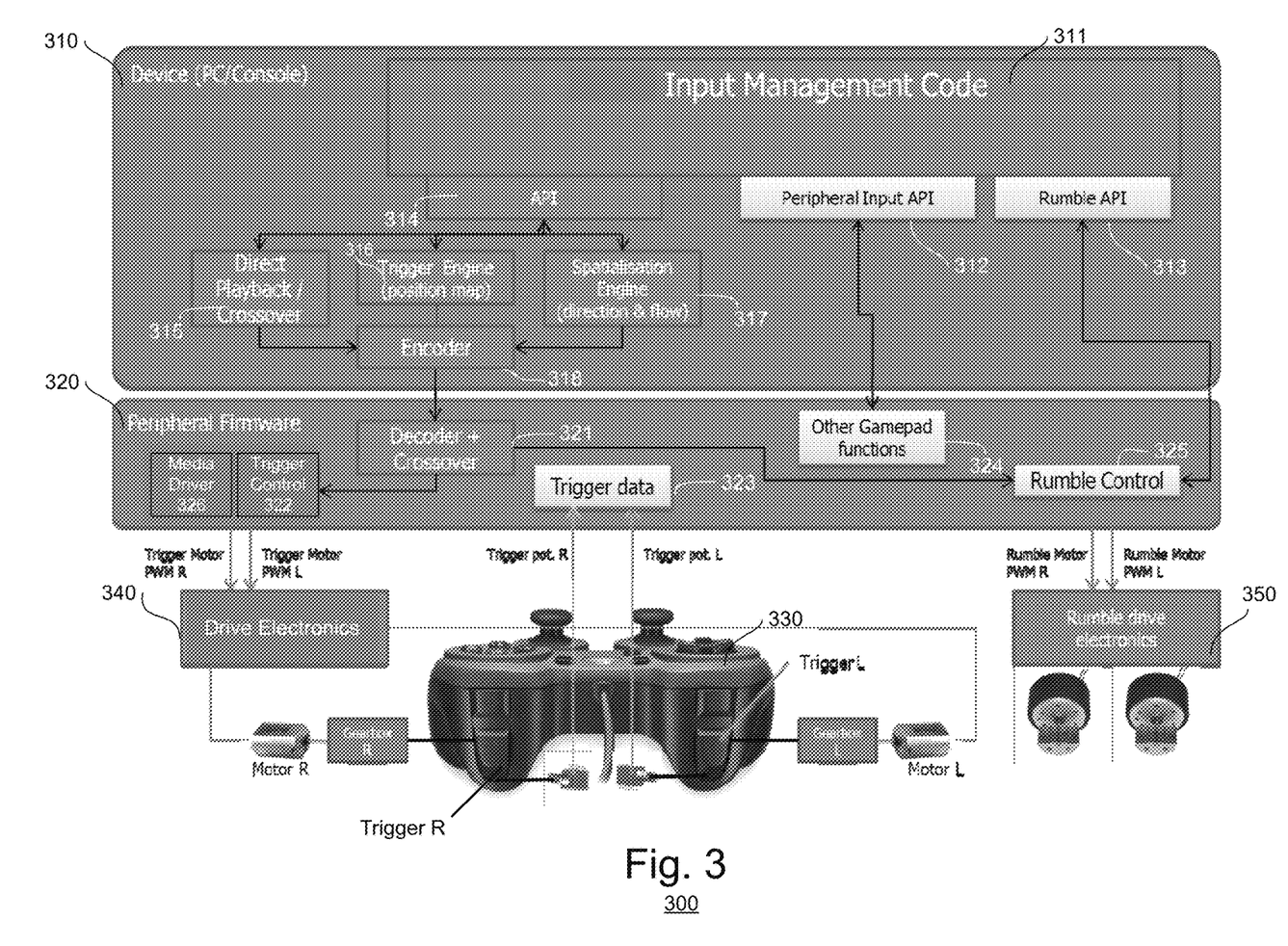
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, haptic effect API 314, direct playback/crossover 315, trigger engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Haptic effect API 314 (identified in FIG. 3 as "API") may include a set of computer-readable functions or routines that are accessible to input management code 311, and that enable input management code 311 to interact with peripheral firmware 320 in order to transmit haptic instructions to controller 330. In addition, a haptic instruction may cause one or more targeted motors or targeted actuators of controller 330 to produce a haptic effect at one or more user input elements of controller 330.

Haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, haptic effect API 314 may store data used for communication with peripheral firmware 320, and used for generation of one or more haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Trigger engine 316 may receive haptic data, such as a haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Trigger engine 316 may further transmit haptic instructions to controller 330. For example, trigger engine 316 may transmit haptic instructions to a variety of user-input elements of controller 330. As previously described, a haptic instruction may cause one or more targeted motors or targeted actuators of controller 330 to produce a haptic effect at one or more user-input elements of controller 330.

Spatialization engine 317 may receive haptic data and may modify the haptic data based on spatialization data. Spatialization data may include data that indicates a desired direction and/or flow of a haptic effect, such as an ordering of haptic effects on respective user input elements. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time or substantially in real time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, trigger engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Media driver module 326 is a firmware module that is configured to provide a haptic effect that is rendered based on a media stream. The media stream may originate from a variety of other applications executed on a system, such as system 100 of FIG. 1. In response to receiving the receiving media stream, media driver module 326 may generate haptic drive signals based on the media stream. The haptic drive signal may be executed by one or more haptic output device(s) of controller 330.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4:
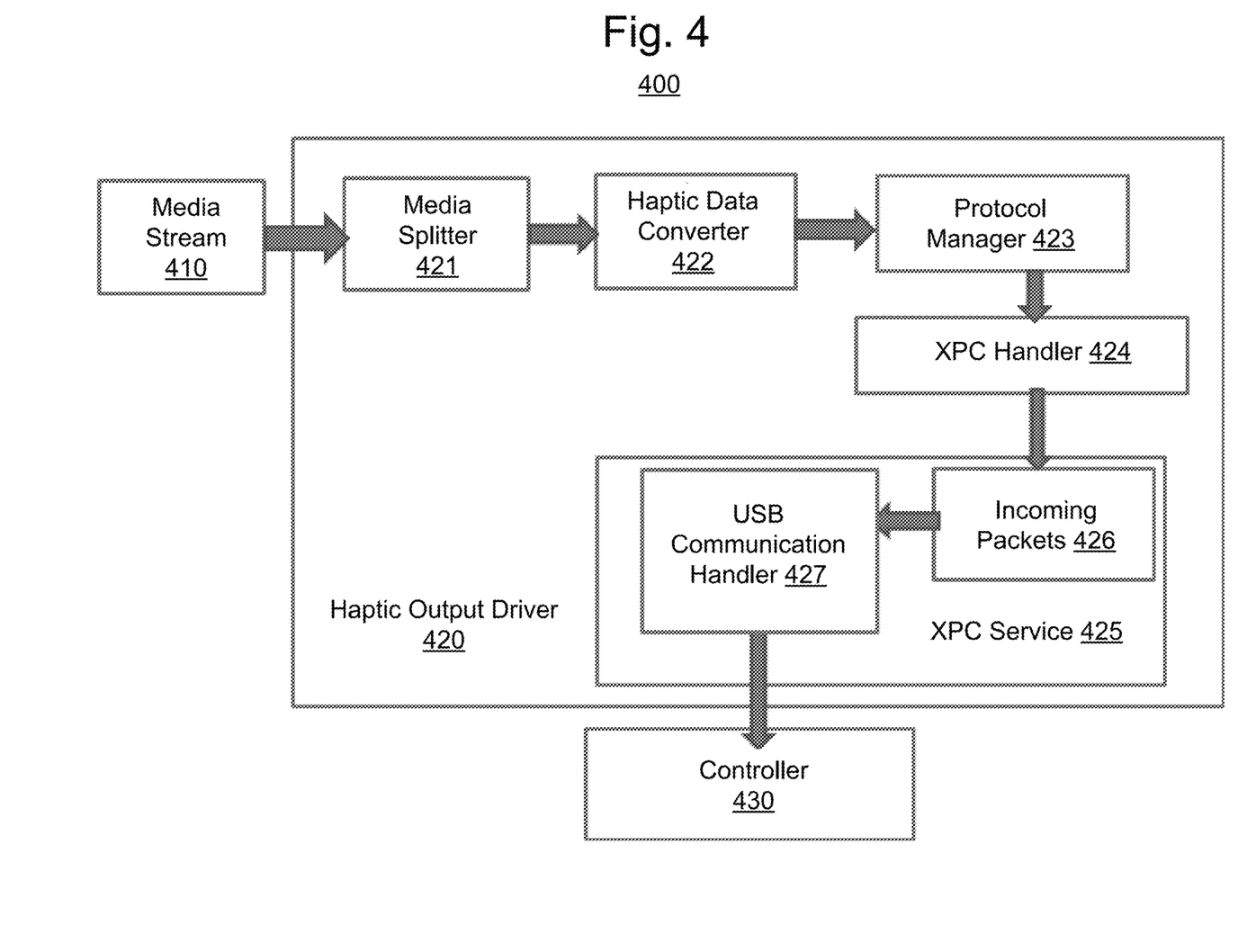
FIG. 4 is a simplified block diagram illustrating a system for providing a haptic effect that is rendered based on a media stream according to another example embodiment of the present invention.

FIG. 4 is a simplified block diagram illustrating a system 400 for providing a haptic effect that is rendered based on a media stream according to another example embodiment of the present invention. As shown in FIG. 4, system 400 includes media stream(s) 410, a haptic output driver 420, and a controller 430.

As an input to system 400, one or more application(s) may generate a variety of media stream(s) 410, such as audio and/or video streams. Media streams 420 are retrieved by haptic output driver 420. Haptic output driver 420 may include a variety of components in order to generate and further handle the haptic drive signals based on media stream(s) 410. In the example configuration depicted in FIG. 4, haptic output driver 420 may include a media splitter 421, a haptic data converter 422, a protocol manager 423, an XPC ("Inter Process Communication") handler 424, and an XPC service 425.

Within haptic output driver 420, media splitter 421 receives incoming media steam(s) 410. For example, media steam(s) 410 may include an interleaved multi-channel (e.g., six channels) audio stream. Splitter block 421 is configured to de-interleave media stream(s) 410, such as the interleaved audio stream, and separate the audio data of the various channels into respective channel buffers (not shown).

Upon storage of the media steam components within the channel buffers, haptic converter 422 may generate the haptic drive signals based on media stream(s) 410. In some embodiments, haptic converter 422 generates the haptic drive signals based on one or more peak detection algorithms (e.g., peak amplitude or frequency). Alternatively, or additionally, haptic converter 422 generates the haptic drive signals based on the positions of user input elements associated with the haptic output devices. Here, haptic output devices may be activated if the associated user input elements are disposed at one or more predetermined position values.

In some instances, the peak detection algorithms may split the media stream into segments based on the update rate the haptic output devices. For example, 1 ms segments may be used for haptic output devices having an update rate of 1 ms. Within each segment, the peak value is identified. The identified peak value may then be converted to a corresponding haptic drive value based on operational characteristics of the haptic output devices. For example, a 16 bit pulse code modulation ("PCM") audio stream may include data values within the range [−32768, 32767]. In this example, a constant maximum strength audio stream may include a stream of "32767" values. During the audio to haptic data conversion, the audio stream values may be converted to haptic drive signal values. Returning to the example, the maximum audio strength value of 32767 may be converted to a haptic drive value of 255.

Subsequently, protocol manager 423 may encode the haptic drive signals according to one or more standardized or proprietary protocols associated with the host device and controller 430. XPC handler 424 is a communication handler that may be configured to interface with XPC service 425. In this example configuration, XPC service 425 receives the encoded drive signals at incoming packets 426, and USB ("Universal Serial Bus") communication handler 427 transmits the encoded haptic drive signals to controller 430 in a USB compliant format.

By implementing the modular architecture of system 400, media steams originating from any application, including applications not originally designed to produce haptic effects, may be used to generate haptic effects. Thus, haptic effects may be extended to any number of applications. In some instances, media streams originating from multiple applications may be used to render the haptic effects. In addition, haptic effects may be rendered at multiple devices.

Figure 5:
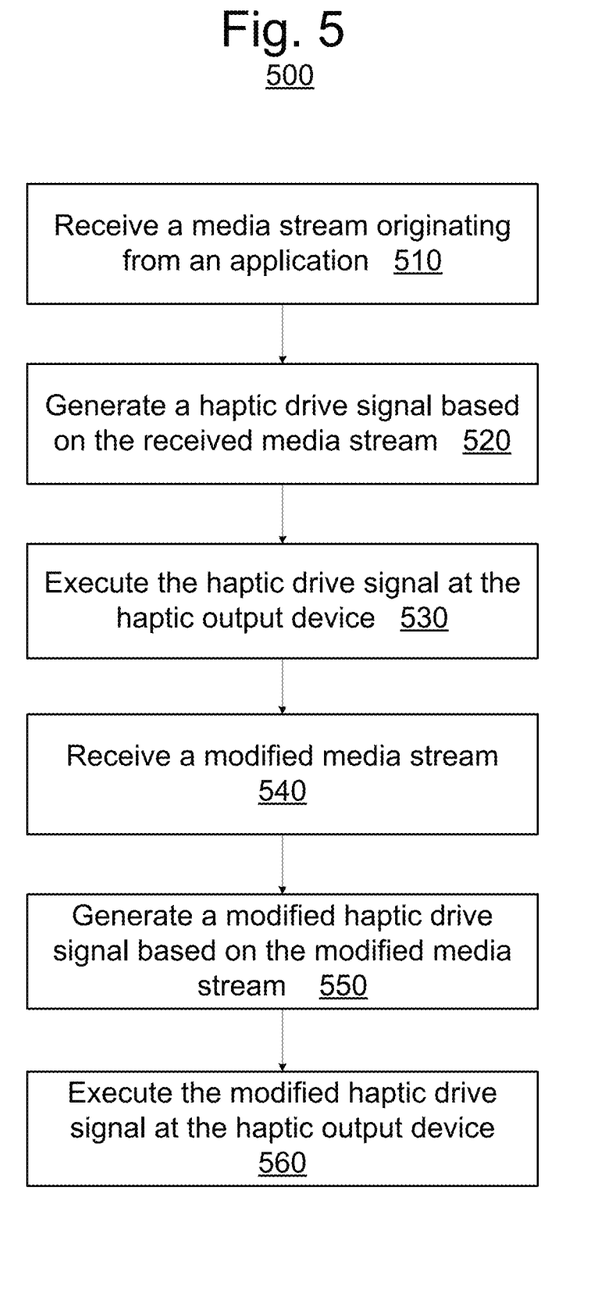
FIG. 5 illustrates a flow diagram of functionality for providing a haptic effect that is rendered based on a media stream according to an example embodiment of the present invention.

FIG. 5 illustrates a flow diagram of functionality for providing a haptic effect that is rendered based on a media stream according to an example embodiment of the present invention. In some configurations, the functionality of the flow diagram of FIG. 5 (and FIG. 7 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 500 receives a media stream that may originate from a variety of applications, at 510. By receiving that media steam 500 from any number of applications, including applications not originally designed to produce haptic effects, use of haptic effects may be extended to such applications.

Upon receiving the media stream, a haptic drive signal is generated based on the media stream, at 520. In some configurations, the haptic drive signal may be embedded within media stream. Alternatively, or additionally, the haptic drive signal may be generated, by the media driver modules, based on one or more characteristics of the media stream (e.g., amplitude, frequency, etc.). In yet another configuration, an offline haptic converter may be used to convert media streams to haptic data using an effect file. The effect file may then be used to render the haptic effects at the haptic output devices using a haptic playback application stored at the host device. Here, haptic drive signals may be generated in real-time, or substantially real-time. Next, at 530, the haptic drive signal is executed, by the haptic output device, to render the haptic effect to an end user.

In some configurations, the media stream may be modified. For example, the media data steam may be modified by a media editing application used by a haptic effect designer. The modified media stream may be received, at 540. In response to the modification, a modified haptic drive signal may be generated based on the modified media stream, at 550. Lastly, the modified haptic effect is rendered at the haptic output device, at 560.

Figure 6:
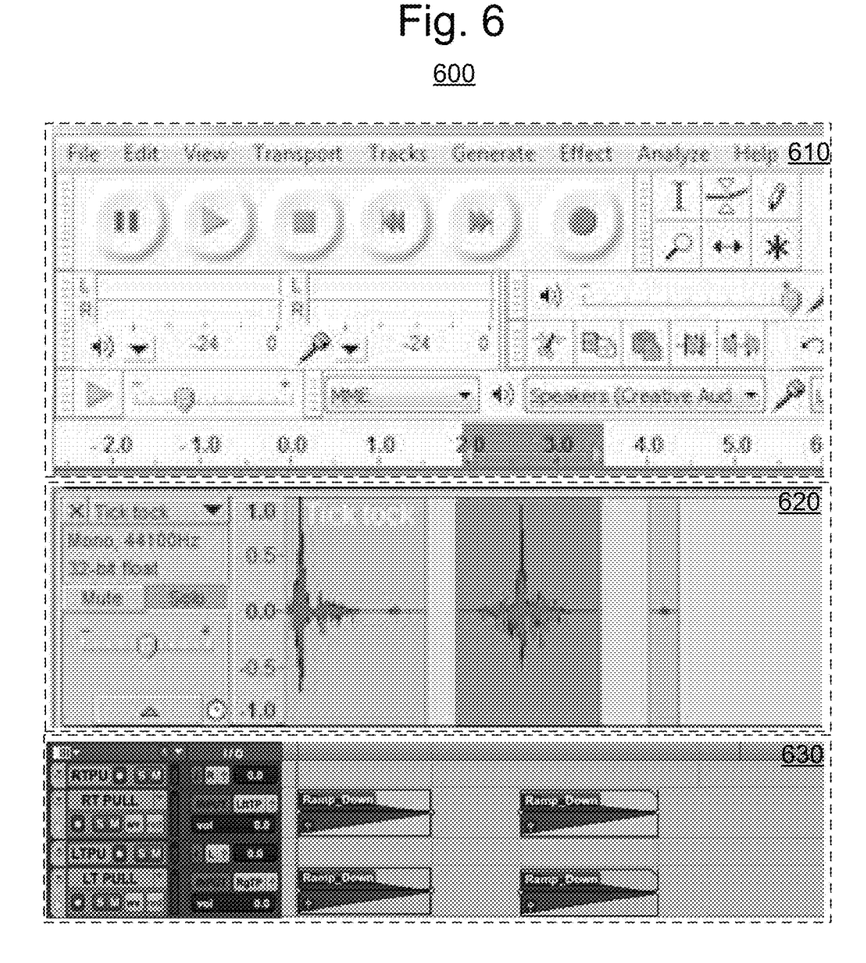
FIG. 6 illustrates a media editing application according to an example embodiment of the present invention.

FIG. 6 illustrates a media editing application 600 according to an example embodiment of the present invention.

As shown in FIG. 6, media editing application 600 may include a plurality of sections, such as a menu view 610, a media stream view 620, and a haptic effect view 630. Within media stream view 620, for example, the amplitude and/or frequency of the media stream, such as an audio stream, may be illustrated. In another example (not shown), the brightness of a video stream also may be graphically depicted. Using one or more peak detection algorithms, haptic effects may be rendered at times having predetermined (e.g., high) amplitudes, frequencies, brightness, or other media stream characteristics. The haptic effects may be added, deleted, and/or otherwise modified within haptic effect view 630.

Figure 7:
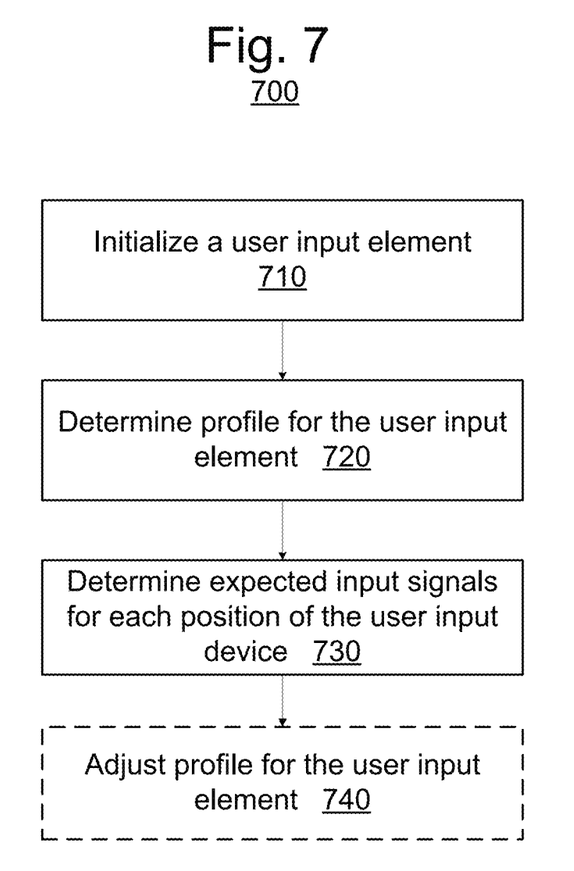
FIG. 7 illustrates a flow diagram of functionality for mapping positions of a user input element with expected input signals according to an example embodiment of the present invention.

FIG. 7 illustrates a flow diagram of functionality 700 for mapping positions of a user input element with expected input signals according to an example embodiment of the present invention.

At the outset, the user input elements of the controller may be initialized, at 710. Here, functionality 700 may initially set position and range information for the user input elements. In some instances, these values may be calculated based on the movement of the user input device from the maximum out position to the grounding position.

Next, functionality 700 determines and stores profiles for the user input elements, at 720. The determined profiles may map each position of the user input device to an analog to digital conversion ("ADC") value. For example, the determined profiles of 720 may map each position of the user input device to an ADC value between 0 and 255.

The determined profiles may utilize either an increasing or a decreasing profile. For example, an increasing profile will produce a value [0,255] when the position of the user input value is read from an 8 bit ADC data. Similarly, a decreasing profile will produce a value [255,0] when read from the 8 bit ADC data.

Subsequently, at 730, functionality 700 determines and stores an expected input signal for each position of the user input device. In some instances, ranges of user input values may be associated with expected input signals.

In some instances, the resting position of the user input elements may vary at different times. For example, after use of the various user input devices, some of the user input devices may not return to the same resting position when the user interaction is removed. In such instances, functionality 700 may adjust the determined profile and expected user input values for such user input elements, at 740. Accordingly, the changed resting position(s) may be accounted for while monitoring the position of the user input elements.

Figure 8:
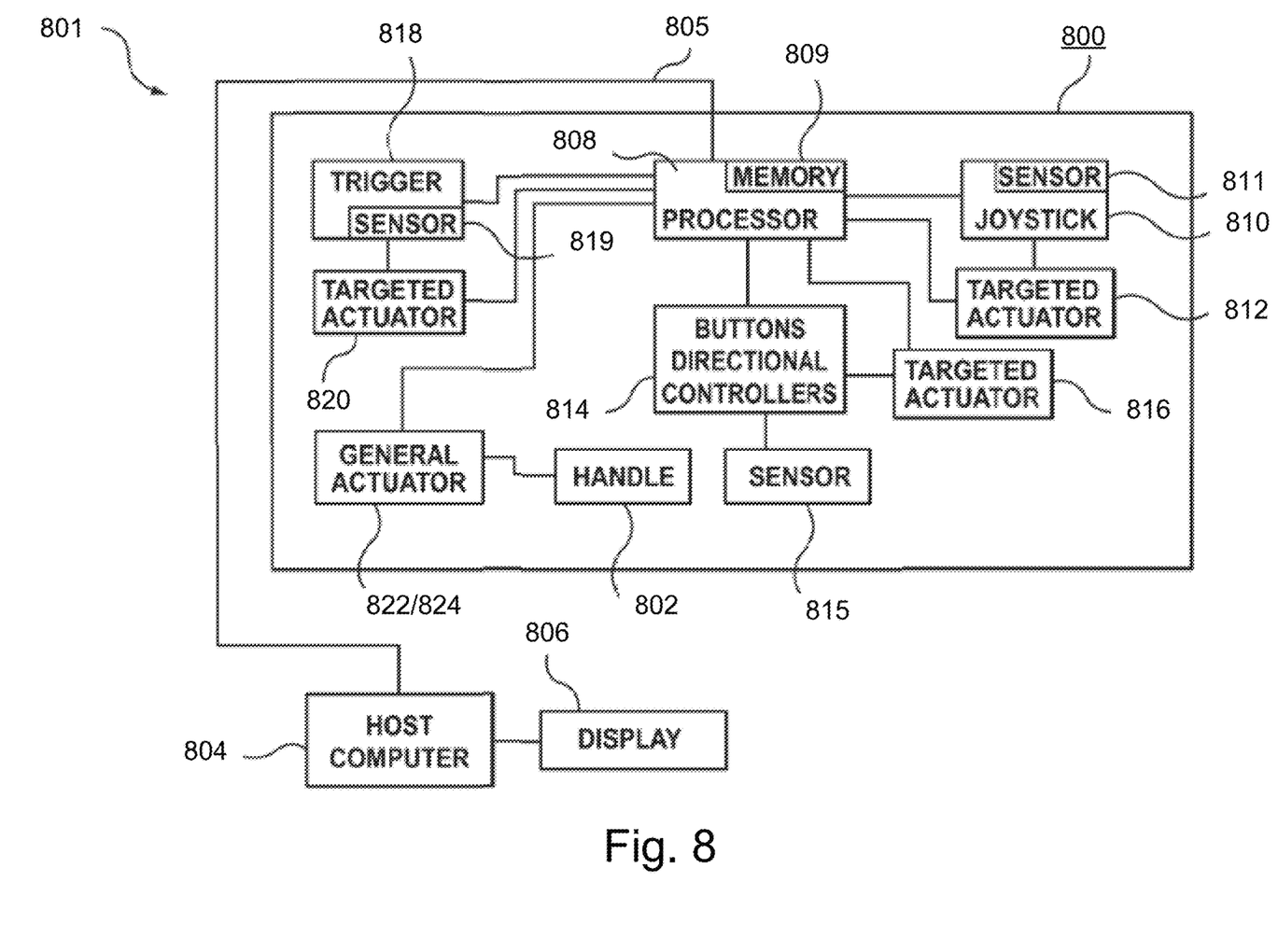
FIG. 8 illustrates a functional block diagram of a controller suitable for use with the embodiments of the present invention.

FIG. 8 illustrates a functional block diagram of a controller 800 suitable for use with the embodiments of the present invention.

As illustrated in FIG. 8, controller 800 may include one or more of a variety of user input elements. A user input element may refer to any interface device manipulated by the user to interact with host computer 804. Example user input elements include analog or digital joy stick 810, button 814, trigger 818, and the like. As understood by one of ordinary skill in the art, one or more of each user input element may be included on controller 800. For example, the present description of trigger 818 does not limit controller 800 to a single trigger. Similarly, those skilled in the art understand that multiple analog or digital sticks, buttons, and other user input elements may be used.

Controller 800 may include local processor 808. Local processor 808 may exchange commands and data with host computer 804 via connection 805. Connection 805 may be a wired or wireless connection using one or more communication protocols known to those skilled in the art. In some instances, controller 800 may be alternatively configured to not include local processor 808. Here, input/output signals from controller 800 may be handled and processed directly by host computer 804. Host computer 804 may be a gaming device console and display device 806 may be screen which is operably coupled to the gaming device console. In some instances, host computer 804 and display device 806 may be combined into a single device.

Controller 800 may include targeted actuators 812, 816, 820 (e.g., motors) to directly drive each of the user input elements thereof as well as one or more general or rumble actuators 822, 824 operably coupled to housing 802 in a location where a hand of the user is generally located. More particularly, analog or digital stick 810 includes a targeted actuator or motor 812 operably coupled thereto, button 814 includes a targeted actuator or motor 816 operably coupled thereto, and trigger 818 includes a targeted actuator or motor 820 operably coupled thereto. In addition to a plurality of targeted actuators, controller 800 includes a position sensor operably coupled to each of the user input elements thereof. More particularly, analog or digital stick 810 includes a position sensor 811 operably coupled thereto, button 814 includes a position sensor 815 operably coupled thereto, and trigger 818 includes a position sensor 819 operably coupled thereto. Local processor 808 is operably coupled to targeted actuators 812, 816, 820 as well as position sensors 811, 815, 819 of analog or digital stick 810, button 814, and trigger 818, respectively. In response to signals received from position sensors 811, 815, 819, local processor 808 instructs targeted actuators 812, 816, 820 to provide directed or targeted kinesthetic effects directly to analog or digital stick 810, button 814, and trigger 818, respectively. Such targeted kinesthetic effects are discernible or distinguishable from general or rumble haptic effects produced by general actuators 822, 824 along the entire body of the controller. The collective haptic effects provide the user with a greater sense of immersion to the game as multiple modalities are being simultaneously engaged (e.g., video, audio, and haptics).

Figure 9A:
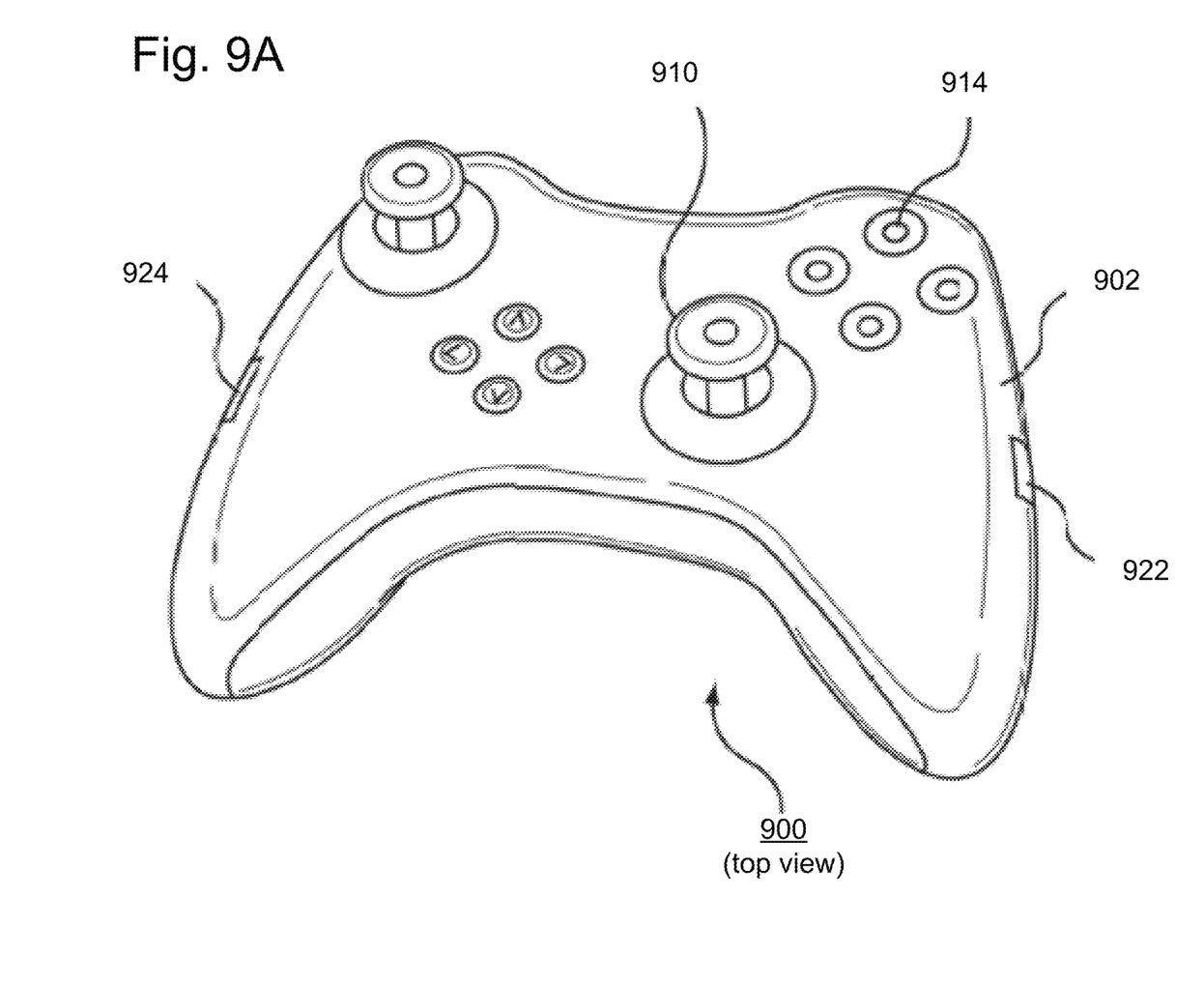
FIGS. 9A and 9B illustrate different views of a controller suitable for use with the embodiments of the present invention.
Figure 9B:
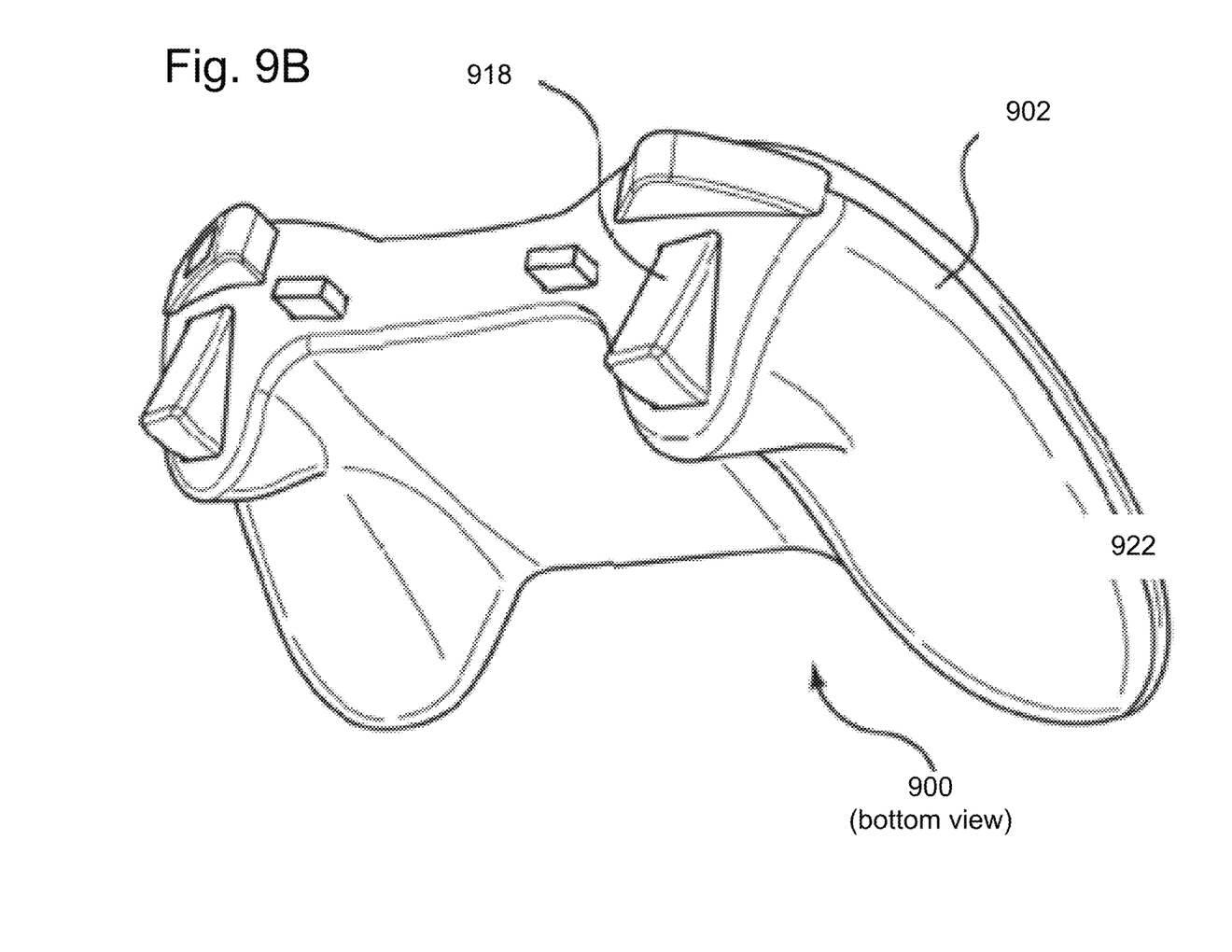

FIGS. 9A and 9B illustrate different views of a controller 900 suitable for use with the embodiments of the present invention. As shown in FIG. 9A and FIG. 9B, controller 900 may include a variety of components such as housing 902, analog or digital joy stick 910, button(s) 914, trigger 918, and rumble actuators 922 and 924.

Housing 902 is shaped to easily accommodate user gripping of controller 900. Controller 900 is an example embodiment of a controller, and the embodiments of the invention may be readily applied to other controller shapes.

Accordingly, the embodiments of the present invention extend the use of haptic effects to numerous applications. In addition, the embodiments of the present invention further provide a platform for haptic effect designers to test and/or modify haptic effects generated based on media streams originating from such applications.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for generating a haptic effect that is rendered based on a media data stream originating from an application, the method comprising:
   receiving the media data stream originating from the application;
   receiving, within a media editing application, a modification to the media data stream to provide a modified media data stream, the modification including modifying a value of one or more characteristics of the media data stream;
   generating a haptic drive signal based on the modified media data stream, wherein the modified media data stream does not comprise embedded haptic data; and
   applying the haptic drive signal to render the haptic effect at a haptic output device.

2. The method according to claim 1, wherein the media data stream includes an audio data stream.

3. The method according to claim 1, wherein the media data stream includes audio and video data streams.

4. The method according to claim 1, wherein the media data stream includes an interleaved multi-channel audio stream.

5. The method according to claim 1, wherein the haptic output device is disposed at a peripheral device comprising a controller or gamepad.

6. The method according to claim 1, wherein the haptic effect is rendered at a user input element of a peripheral device.

7. The method according to claim 1, wherein the haptic effect is rendered at a trigger element of a peripheral device.

8. The method according to claim 1, wherein the haptic drive signal is generated based on the modified media data stream using a offline haptic converter.

9. A device comprising:
a processor; and
a memory storing a program for execution by the processor, the program including instructions for:
receiving a media data stream originating from an application;
receiving, within a media editing application, a modification to the media data stream to provide a modified media data stream, the modification including modifying a value of one or more characteristics of the media data stream;
generating a haptic drive signal based on the modified media data stream, wherein the modified media data stream does not comprise embedded haptic data; and
applying the haptic drive signal to render a haptic effect at a haptic output device.

10. The device according to claim 9, wherein the media data stream includes an audio data stream.

11. The device according to claim 9, wherein the media data stream includes audio and video data streams.

12. The device according to claim 9, wherein the media data stream includes an interleaved multi-channel audio stream.

13. The device according to claim 9, wherein the haptic output device is disposed at a peripheral device comprising a controller or gamepad.

14. The device according to claim 9, wherein the haptic effect is rendered at a user input element of a peripheral device.

15. The device according to claim 9, wherein the haptic effect is rendered at a trigger element of a peripheral device.

16. The device according to claim 9, wherein the haptic drive signal is generated based on the modified media data stream using a offline haptic converter.

17. A non-transitory computer readable storage medium storing a program configured to be executed by a processor, the program comprising instructions for:
receiving a media data stream originating from an application;
receiving, within a media editing application, a modification to the media data stream to provide a modified media data stream, the modification including modifying a value of one or more characteristics of the media data stream;
generating a haptic drive signal based on the modified media data stream, wherein the modified media data stream does not comprise embedded haptic data; and
applying the haptic drive signal to render a haptic effect at a haptic output device.

18. The non-transitory computer readable storage medium of claim 17, wherein the media data stream includes an audio data stream.

19. The non-transitory computer readable storage medium of claim 17, wherein the media data stream includes audio and video data streams.

20. The non-transitory computer readable storage medium of claim 17, wherein the media data stream includes an interleaved multi-channel audio stream.

21. The non-transitory computer readable storage medium of claim 17, wherein the haptic output device is disposed at a peripheral device comprising a controller or gamepad.

22. The non-transitory computer readable storage medium of claim 17, wherein the haptic effect is rendered at a user input element of a peripheral device.

23. The non-transitory computer readable storage medium of claim 17, wherein the haptic effect is rendered at a trigger element of a peripheral device.

24. The non-transitory computer readable storage medium of claim 17, wherein the haptic drive signal is generated based on the modified media data stream using a offline haptic converter.

25. The method according to claim 1, wherein the haptic drive signal is generated in real-time, or substantially real-time.

* * * * *